May 6, 1947.  A. P. ADAMSON  2,420,160
SELF SYNCHRONOUS SYSTEM FOR TRANSMITTING ANGULAR MOTION
Filed March 7, 1946

Inventor:
Arthur P. Adamson,
by Claude H. Mott
His Attorney.

Patented May 6, 1947

2,420,160

UNITED STATES PATENT OFFICE 2,420,160

SELF-SYNCHRONOUS SYSTEM FOR TRANSMITTING ANGULAR MOTION

Arthur P. Adamson, Ballston Spa, N. Y., assignor to General Electric Company, a corporation of New York Application March 7, 1946, Serial No. 652,574

6 Claims. (Cl. 318—23)

The present invention relates to systems for transmitting angular motion, and more particularly to motion-transmitting systems embodying electrical transmitter and receiver devices known as Selsyns.

Selsyn devices, which are well known in the prior art, are commonly used for the purpose of electrically transmitting angular motion to a remote point for indication, control purposes, etc. The usual system comprises transmitter and receiver Selsyn devices, each being similar in construction and each comprising a rotor and a stator carrying primary and secondary windings. The secondary windings of the transmitter and receiver Selsyns are provided with polyphase connections, generally three, which are electrically interconnected. When the primary windings of the Selsyns are energized from a common source of periodically varying current, a torque is produced in the receiver which moves the rotor of the receiver into angular correspondence with the rotor of the transmitter. If, in a typical Selsyn system, the rotor of the receiver is forcibly displaced from the correspondence position, the restoring torque varies approximately as a sinusoidal function of the rotor displacement. Because of this rather rapid build-up of restoring torque, an unstable condition may arise in which the rotor of the receiver Selsyns "runs away" and rotates continuously as an induction motor, or oscillates violently about the correspondence position as a result of some initial disturbance of the rotor. This condition is particularly troublesome in cases where the receiver is connected to operate a relatively high inertia load. To overcome this difficulty, it has been customary heretofore to provide the receiver Selsyn with some form of mechanical damping device to dissipate the synchronizing energy in the event of a substantial departure of the receiver from correspondence with the transmitter.

Another difficulty which has been encountered in using Selsyn systems is the danger of overheating in case the receiver should become mechanically locked in an out-of-correspondence position. Since the current flow between transmitter and receiver Selsyn units varies in accordance with the degree of departure of the Selsyn from correspondence, serious overheating may occur under this condition, and to design a Selsyn to carry this heavy current without overheating is expensive and wasteful.

An object of the present invention is to provide a new and improved electrical position-transmitting system.

A further object of the invention is to provide a Selsyn system in which the restoring or synchronizing torque characteristic is altered electrically so that little or no mechanical damping is required to obtain stable operation.

Another object of the invention is to provide a Selsyn system in which electrical means is provided for automatically reducing the flow of current between transmitter and receiver Selsyn units in case they are forcibly displaced from correspondence a considerable amount whereby overheating is prevented.

A still further object is to provide a Selsyn system which has relatively low maximum restoring torque without sacrificing a high torque gradient near the correspondence position which is required for high accuracy applications.

Further objects and advantages of my invention will become apparent and my invention will be better understood from the following description referring to the accompanying drawing, and the features of novelty which characterize my invention will be pointed out with particularity in the claims annexed to and forming a part of this specification.

Figure 4:
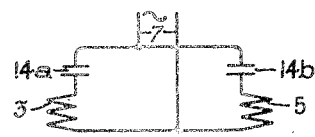

And Fig. 4 shows another modified energizing circuit for the Selsyn primary windings.

Figure 1:
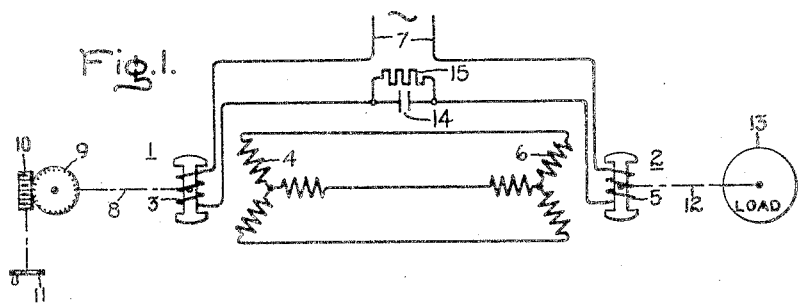
Fig. 1 is a schematic representation of a Selsyn angular position-transmitting system embodying the subject matter of the present invention.

Referring to Fig. 1 of the drawing, I have shown a Selsyn angular position-transmitting system comprising a transmitter Selsyn indicated generally at 1 and a receiver Selsyn indicated generally at 2. The Selsyns shown in the schematic representation may be of conventional construction, the transmitter Selsyn being shown as comprising a rotor having a primary or rotor winding 3 and a polyphase Y-connected stator or secondary winding 4. The receiver Selsyn 2 is similar, being shown as comprising a rotor having a rotor or primary winding 5 and a polyphase Y-connected stator or secondary winding 6. As is usual in such an arrangement, the polyphase connections of the stator windings 4 and 6 of the transmitter and receiver Selsyns are electrically interconnected as shown.

The primary or rotor windings 3 and 5 of the transmitter and receiver Selsyns are electrically connected in series circuit relation as shown, and are energized from a suitable source of periodically varying current 7.

As is well understood by those skilled in the art, when the primary windings of the Selsyns are energized from a common source of periodically varying current, a torque is produced which moves the rotor of the receiver Selsyn into angular correspondence with the rotor of the transmitter Selsyn, and subsequent rotary movements of the transmitter Selsyn cause corresponding rotary movements of the receiver Selsyn. Therefore, such a system can be conveniently used for transmitting rotary motion to a remote point electrically for indication, control purposes, etc. Thus by way of illustration I have shown the rotor of the transmitter Selsyn as being mechanically coupled to a rotatable shaft 8, carrying at its end a gear 9 which meshes with a coacting worm gear 10 which may be, as shown, mechanically coupled to a suitable handcrank 11. The rotor of the receiver Selsyn 2 is shown as being mechanically coupled to a shaft 12 which is in turn coupled to a rotatable load indicated schematically at 13. With such a system the rotatable load or indicator 13 may be rotatably positioned from a remote point by rotating the hand crank 11 which operates to change the relative position of the primary and secondary windings of the transmitter Selsyn. This causes a corresponding rotation of the rotor of the receiver Selsyn and the load 13 as will be clear from the foregoing.

Figure 2:
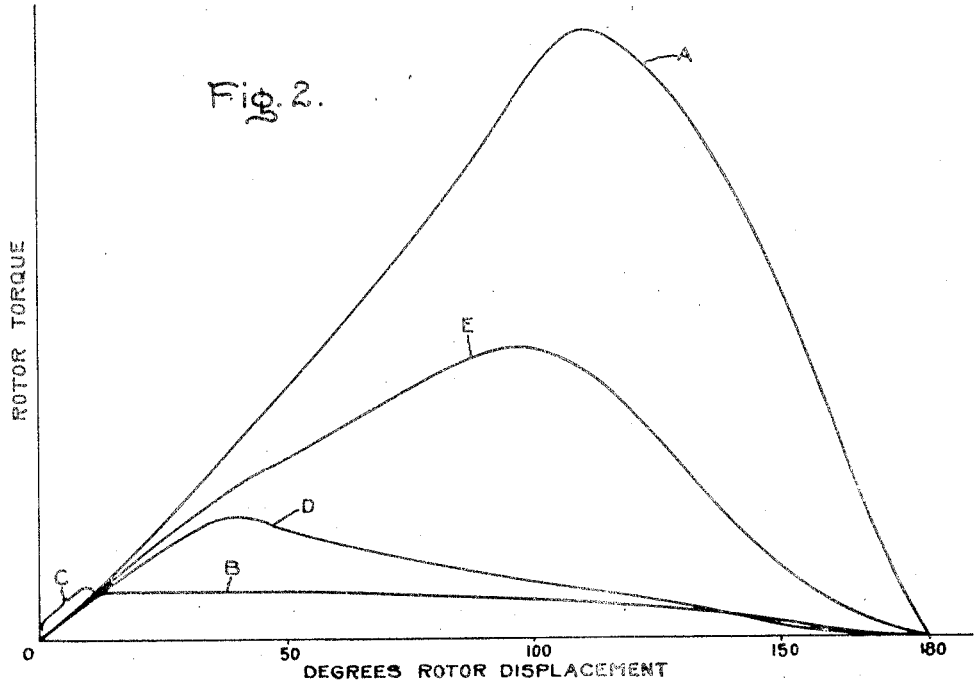
Fig. 2 is a graphical representation useful in explaining the theory of operation of the invention.

The Selsyn system thus far described is entirely conventional and is subject to certain inherent operating disadvantages. In cases where the load 13 has considerable inertia, the receiver Selsyn 2 may be unstable, having a tendency, when once displaced from the correspondence position, to rotate continuously as in an induction motor or to oscillate violently about the correspondence position. This is due to the torque characteristic of the conventional Selsyn which is shown in the graphical representation of Fig. 2 of the drawing. Referring to Fig. 2, the curve A shows the approximate variation of the synchronizing or restoring torque of the receiver Selsyn in terms of displacement of the rotor from the correspondence position. It will be noted from an inspection of the curve A that the torque varies approximately as a sinusoidal function of the rotor displacement. In order to obtain a reasonably good correspondence accuracy in a Selsyn system, it is necessary to have a relatively high torque gradient near the correspondence position in order to secure a high "pull-in" torque to overcome friction forces tending to oppose movement of the Selsyn rotor. If the Selsyn is designed to obtain the necessary torque gradient near the correspondence position, the maximum torque is much higher than necessary due to the inherent nature of the torque curve of the conventional Selsyn, such as the curve A, described above. The unstable condition referred to above is caused by the relatively high value of maximum restoring torque which is obtained when the receiver Selsyn is for some reason displaced a considerable angular amount from the correspondence position. The high restoring torque tends to throw the rotor of the Selsyn past the correspondence or null position at a high velocity resulting in instability. Heretofore, this difficulty has been overcome by the provision of some suitable form of mechanical damping device on the rotor of the receiver Selsyn to dissipate the synchronizing energy.

According to the present invention, the stability problem is solved by the provision of electrical means for changing the shape of the torque curve of the receiver Selsyn in such a way as to greatly reduce the maximum torque value without in any way changing the desired high torque gradient necessary for correspondence accuracy in the region of the correspondence position. This arrangement permits a great reduction in size or a complete elimination of the mechanical damping devices heretofore used.

In order to effect a change in the torque curve of the receiver Selsyn, I make use of the fact that there is a considerable change in the effective inductance of the primary winding when the rotor is moved out of the correspondence position. This change in induction is the result of a relative displacement of the flux axes of the Selsyn stator and rotor. By the expedient of initially tuning the Selsyn primary winding excitation circuit to a state of approximate resonance when the Selsyns are in correspondence, the change of primary inductance upon a departure of the receiver Selsyn from the correspondence position acts to detune the excitation circuit whereby the current flow in the Selsyn primary winding and the resultant torque are greatly reduced for large angular displacements from the correspondence position without appreciably affecting the normal torque gradient near the correspondence position which is required for high accuracy of correspondence.

In the embodiment of the invention shown in Fig. 1 of the drawing, the tuning of the circuits of the primary windings of the Selsyn is accomplished by the provision of a capacitor 14 which is connected as shown in series circuit relation with the primary windings 3 and 5 of the transmitter and receiver Selsyns 1 and 2. The capacitive reactance of the capacitor 14 is selected relative to the inductive reactance of the windings 3 and 5 such that when the Selsyns are in correspondence, the excitation circuit is tuned to approximate resonance. If then for some reason the Selsyns are forced out of correspondence a considerable amount, the circuit is detuned, resulting in a substantial reduction of the current flowing in the excitation circuit. This effect is clearly shown by the curve B of Fig. 2 which, when compared with curve A, shows that there is a substantial reduction in the maximum restoring torque with the tuned circuit arrangement without changing the initial torque gradient nearer the correspondence position indicated on the curve at C.

The magnitude of the maximum torque point can be conveniently adjusted with my invention by the addition of suitable resistance in series or in parallel with the capacitor 14 which can be used to change the "Q" of the circuit. For this purpose I have illustrated a resistor 15 which is connected in parallel with the capacitor 14. If the resistor 15 has a very high resistance, a torque characteristic similar to curve B will be obtained. If the resistance is lowered, the maximum torque increases as indicated by curve D. If the resistance of resistor 15 is lowered still further, a curve, such as the curve E may be obtained having a still higher maximum torque value. Thus it will be clear that by suitably selecting the resistance value of the resistor 15, the desired torque characteristic may be obtained. It is to be particularly noted that the various characteristics indicated by the curves B, D and E are obtained without affecting the torque gradient of the Selsyns near the correspondence point indicated at C, so that the accuracy of the Selsyn system is not impaired even though the maximum torque is considerably reduced as indicated.

It will be clear from the foregoing that according to my invention the maximum torque value can be reduced to the desired value whereby stabilization of the receiver Selsyn is obtained without the necessity of resorting to mechanical damping devices.

Another inherent advantage in my improved Selsyn system involving a tuned excitation circuit, is the fact that overheating is automatically prevented in the event that the rotor of the receiver Selsyn is for some reason mechanically locked in an out-of-correspondence position. In a conventional Selsyn system if the rotors of the Selsyn are held in out-of-correspondence position, a very high current flows resulting in serious overheating. However, in my improved system, under this condition the excitation circuit is detuned so that there is a substantial reduction in the current flowing in the excitation circuit, thus automatically preventing overheating.

Figure 3:
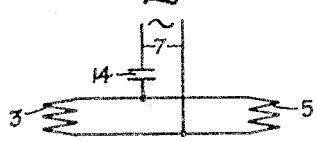
Fig. 3 shows a modified energizing circuit for the primary windings of the Selsyns.

My invention is not limited to an arrangement in which the primary windings of the Selsyn and the tuning capacitor are connected in series circuit relation, as shown in Fig. 1, as there are many other equivalent arrangements which may be used. Thus there is shown in Fig. 3 of the drawing an alternative arrangement in which the primary windings 3 and 5 of the transmitter and receiver Selsyns are connected in parallel with the capacitor 14 connected in series with the two parallel branches including the Selsyn primary windings. With this arrangement it will be clear that a movement of the rotor of either the transmitter or receiver Selsyn from the correspondence position will act to detune the associated primary windings, the effect being similar to that described in connection with Fig. 1.

In Fig. 4, a still different alternative arrangement for energizing the primary windings 3 and 5 is shown. In this arrangement the primary windings 3 and 5 are paralleled as in the Fig. 3 arrangement, but instead of using one common tuning capacitor, separate tuning capacitors 14a and 14b are provided in each of the parallel branches which supply current to the primary windings 3 and 5. With this arrangement the energizing circuits for the primary windings 3 and 5 can be separately tuned.

While I have shown and described particular embodiments of my invention, it will occur to those skilled in the art that various changes and modifications may be made without departing from my invention, and I therefore aim in the appended claims to cover all such changes and modifications as fall within the true spirit and scope of my invention.

What I claim as new and desire to secure by Letters Patent of the United States is:

1. A system for transmission of angular motion comprising transmitter and receiver devices, said devices each having relatively rotatable primary and secondary windings, the secondary windings of both of said devices having similar polyphase connections which are electrically connected, an excitation circuit for electrically connecting the primary windings of said devices to a source of periodically varying current, said circuit including capacitive reactance means so dimensioned that when the rotary windings of said devices are in a position of angular correspondence, the excitation circuit for said primary windings is tuned approximately to resonance, said excitation circuit being detuned upon a substantial departure of the rotary windings from a correspondence position due to a change in inductive reactance of the primary windings whereby the maximum pull-in torque of said devices is limited and the stability of the system improved while maintaining a relatively high torque gradient near the correspondence position required for high correspondence accuracy of said devices.

2. In a Selsyn angular position transmitting system comprising similar transmitter and receiver Selsyns each having a rotor and a stator carrying primary and secondary windings, the secondary windings having similar electrically connected polyphase connections whereby when the primary windings are energized from a common source of periodically varying current, relative rotation of the transmitter rotor causes a torque tending to produce a corresponding rotation of the receiver rotor, capacitor means connected to tune the energizing circuits of the primary windings of said Selsyns to a state of approximate resonance when the rotors of said Selsyns are in angular correspondence whereby the detuning effect incident to the change in effective inductance of the primary windings when said rotors are forced out of correspondence results in a reduction of the current flowing in said primary windings and prevents overheating of said Selsyns which would otherwise occur in the absence of said capacitance means.

3. Angular motion transmission apparatus comprising transmitting and receiving devices each having relatively rotatable primary and secondary windings, the secondary windings having similar polyphase connections which are electrically connected, means for supplying periodically varying current to the primary windings of said devices, and capacitance means for tuning the circuit supplying at least one of said primary windings to a condition of approximate resonance when the rotary windings of said devices are in angular correspondence.

4. Angular motion transmission apparatus comprising transmitting and receiving devices each having relatively rotatable primary and secondary windings, the secondary windings having similar polyphase connections which are electrically connected, an energizing circuit for the primary windings of said devices adapted to be connected to a source of periodically varying current, said circuit including the primary windings of said devices and a capacitor connected in series circuit relation.

5. Angular motion transmission apparatus comprising transmitting and receiving devices each having relatively rotatable primary and secondary windings, the secondary windings having similar polyphase connections which are electrically connected, and an energizing circuit for the primary windings of said devices adapted to be connected to a source of periodically varying current, said circuit including the primary windings of said devices connected in parallel and a capacitor connected in series with said parallel connected windings.

6. Angular motion transmission apparatus comprising transmitting and receiving devices each having relatively rotatable primary and secondary windings, the secondary windings having similar polyphase connections which are electrically connected, an energizing circuit adapted to be connected to a source of periodically varying current, said circuit having two parallel connected branches, each branch including the primary winding of a different one of said devices and a capacitor connected in series therewith and proportioned so as to tune the primary winding circuits for approximate resonance when the rotatable windings of said devices are in angular correspondence.

ARTHUR P. ADAMSON.